US006939590B2

(12) United States Patent
van de Camp et al.

(10) Patent No.: US 6,939,590 B2
(45) Date of Patent: Sep. 6, 2005

(54) PAPERBOARD TUBE STRUCTURES WITH ONE OR MORE CUT-AND-FOLDED PLIES

(75) Inventors: Wim van de Camp, Hartsville, SC (US); Xiaokai Niu, Hartsville, SC (US)

(73) Assignee: Sonoco Development, Inc., Hartsville, SC (US)

(*) Notice: Subject to any disclaimer, the term of this patent is extended or adjusted under 35 U.S.C. 154(b) by 355 days.

(21) Appl. No.: 10/392,513

(22) Filed: Mar. 20, 2003

(65) Prior Publication Data

US 2004/0182500 A1 Sep. 23, 2004

(51) Int. Cl.[7] ......................... B31C 11/00; B31C 11/02; B31C 3/00; B31C 13/00; B29D 23/00

(52) U.S. Cl. ...................... 428/34.2; 156/191; 156/192; 156/195; 156/227; 156/256; 156/257; 428/138; 493/287

(58) Field of Search ................................ 156/185, 191, 156/192, 195, 227, 256, 257; 428/34.2, 138; 493/287

(56) References Cited

U.S. PATENT DOCUMENTS

| | | | | |
|---|---|---|---|---|
| 201,929 A | | 4/1878 | MacDonald | |
| 493,929 A | | 3/1893 | Holcomb | |
| 1,542,427 A | | 6/1925 | Wardell | |
| 3,195,427 A | * | 7/1965 | Adams | 156/195 |
| 3,280,709 A | * | 10/1966 | Elam | 156/190 |
| 3,826,445 A | * | 7/1974 | Le Hardy | 242/118.32 |
| 3,846,218 A | | 11/1974 | Wootten | |
| 3,923,575 A | | 12/1975 | Wootten | |
| 3,953,279 A | | 4/1976 | Wootten | |
| 5,076,440 A | * | 12/1991 | Drummond | 493/301 |

* cited by examiner

*Primary Examiner*—Jeff H. Aftergut
(74) *Attorney, Agent, or Firm*—Alston & Bird LLP

(57) ABSTRACT

There is provided a paperboard tube structure with an intermediate ply having cut-and-folded tabs to increase the effective thickness of the intermediate ply. The paperboard tube includes a plurality of paperboard plies wrapped one atop another about an axis with the intermediate ply positioned between an interior paperboard ply and an exterior paperboard ply. A plurality of cut-and-folded tabs are each created by a nonlinear incision in the intermediate ply that extends from a first endpoint to a second endpoint thereby creating a folding axis along a line from the first endpoint to the second endpoint. The tab is folded about the folding axis to overlie a region of the intermediate ply adjacent the folding axis. The tabs increase the effective thickness of the wall of the paperboard tube. Therefore, the bending stiffness of the paperboard tube is increased compared to a tube without cut-and-folded tabs or the tube requires less paperboard ply material to maintain an approximately equal bending stiffness as a tube without cut-and-folded tabs.

27 Claims, 4 Drawing Sheets

PAPERBOARD TUBE STRUCTURES WITH ONE OR MORE CUT-AND-FOLDED PLIES

FIELD OF THE INVENTION

The present invention relates generally to paperboard tube structures. More particularly, the invention relates to paperboard tube structures having a construction promoting an enhanced wall thickness and bending stiffness for a given mass of the tube structure.

BACKGROUND OF THE INVENTION

Within the paperboard tube industry, it is desirable to minimize the amount of ply material used to manufacture a paperboard tube. Paperboard tube structures are often used in consumer good applications such as paper towel rolls or toilet paper rolls, but they are also used in manufacturing applications such as cores for supporting rolled sheet material or in industrial applications such as forms or templates for columnar structures.

Tube structures must possess structural properties commensurate with their intended applications. Paperboard tube designs and manufacturing procedures preferably should minimize the amount of raw materials needed to achieve the required structural properties for the particular tube structure. By reducing the material needed, the expense of producing the paperboard tube structures will likewise decrease.

The bending stiffness and other strength properties of tube structures depend on a number of factors, including the strength of the individual plies of the tube and the wall thickness of the tube. As a general rule, increasing the wall thickness of a tubular structure will result in a stronger tube. An increase in wall thickness can be brought about by using additional plies and/or using thicker plies. In either case, an additional amount of raw material is required, which increases the cost of the paperboard tube. Tube strength can also be increased by using denser, stronger plies, but such stronger plies are relatively more costly.

Therefore, a need exists for a paperboard tube structure requiring a minimal amount of paperboard material while maintaining adequate tube strength.

SUMMARY OF THE INVENTION

The invention addresses the above needs and achieves other advantages by providing a paperboard tube formed by a plurality of paperboard plies wrapped one atop another about an axis to form a paperboard tube structure. The plies include an interior paperboard ply proximate an inner surface of the tube structure, an exterior paperboard ply proximate an outer surface of the tube structure, and at least one intermediate paperboard ply positioned between the interior and exterior paperboard plies. The intermediate ply includes a plurality of tabs each created by a nonlinear incision in the intermediate ply. Each incision extends from a first endpoint to a second endpoint thereby creating a folding axis along a line from the first endpoint to the second endpoint. Each tab is folded or rotated about the folding axis through an angle of substantially 180 degrees so the tab overlies a region of the intermediate ply adjacent the folding axis. Accordingly, the tab and the underlying region form a double thickness of ply material. As a result, the plies on either side of the ply with tabs are spaced farther apart from each other, thereby increasing the moment of inertia of the cross section of the paperboard tube. The tabs of the intermediate ply increase the effective thickness of the wall of the paperboard tube when compared with a paperboard tube made from plies having no tabs. Therefore, the bending stiffness of the paperboard tube structure can be approximately maintained while using less paperboard ply material or the bending stiffness of the paperboard tube structure can be increased while using an equivalent amount of paperboard ply material.

The nonlinear incisions can be of any geometric shape such as arcuate, horseshoe, or multilateral. In one embodiment of the invention, the tabs include an adhesive on a contacting face of the tab to affix the tab to the underlying region of the intermediate ply. In a further embodiment, each incision includes at least three endpoints and creates a plurality of tabs, wherein each tab has a folding axis along a line between two adjacent endpoints and each tab is folded to overlie the region of the intermediate ply adjacent its respective folding axis. An example of an incision with at least three endpoints creating a plurality of tabs is a single "X" shaped incision with four endpoints generating four triangular tabs.

In one embodiment of the invention, the paperboard tube comprises a plurality of intermediate plies disposed between the interior paperboard ply and the exterior paperboard ply, with one or more of the intermediate plies having tabs. Another embodiment includes at least one partitioning ply without tabs positioned between two intermediate paperboard plies each having tabs. A further embodiment is a paperboard tube with at least one intermediate ply with tabs folded onto an exterior-facing surface of the intermediate ply and at least one intermediate ply with tabs folded onto an interior-facing surface of the intermediate ply.

A method of manufacturing a paperboard tube is also provided. At least one intermediate ply is pierced to form a plurality of nonlinear incisions. Each incision extends from a first endpoint to a second endpoint thereby creating a tab and a folding axis for the tab defined by a line between the first endpoint and the second endpoint. Each tab is folded or rotated 180 degrees about its respective folding axis so that each tab lies against an underlying region of the intermediate ply adjacent the folding axis. Finally, a plurality of plies is wound about an axis to form a paperboard tube structure. The ply or plies having the tabs are disposed between an interior ply defining an inner surface of the paperboard tube and an exterior ply defining an outer surface of the paperboard tube.

BRIEF DESCRIPTION OF THE DRAWINGS

Figure 1:
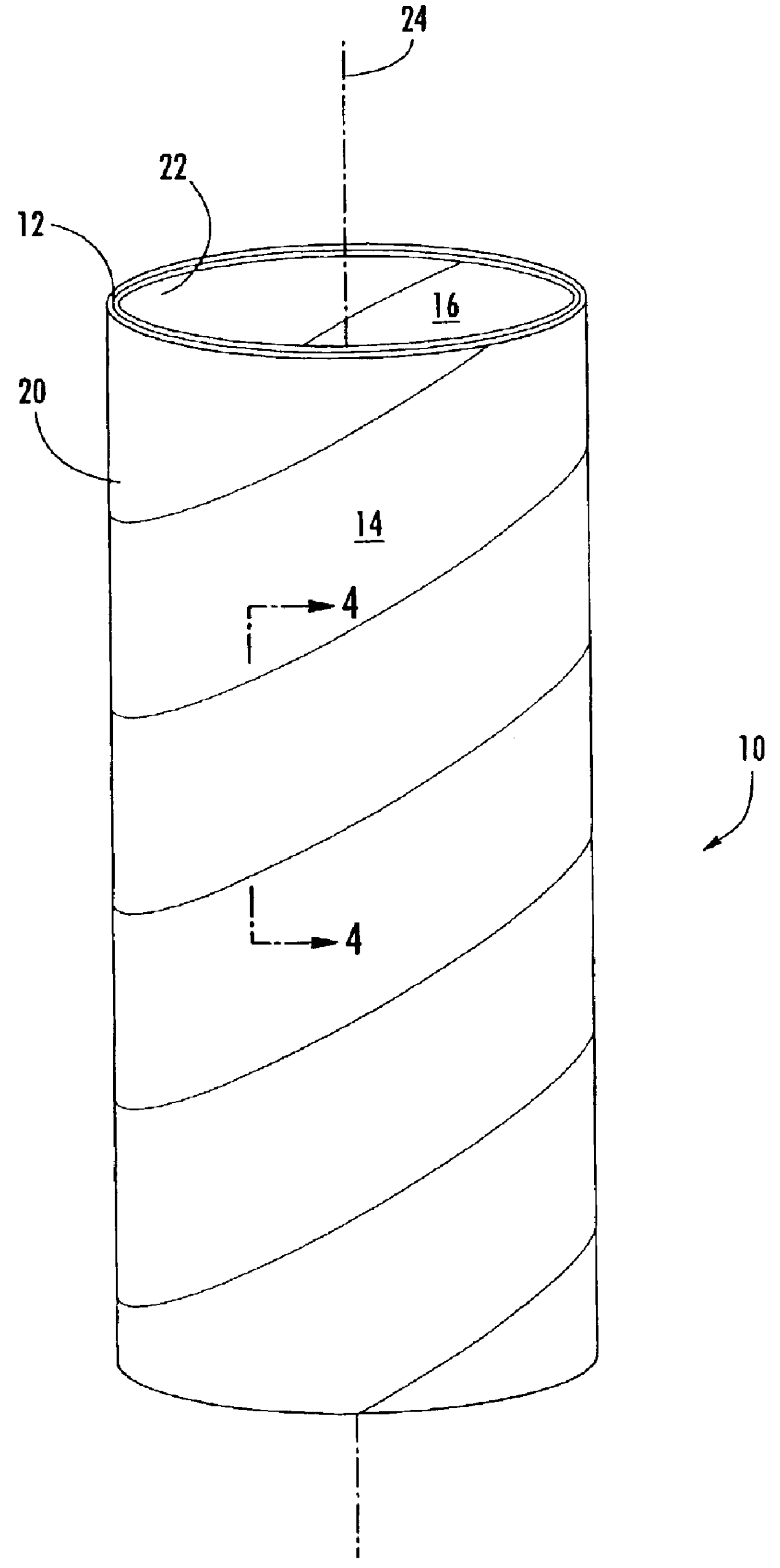
Figure 2:
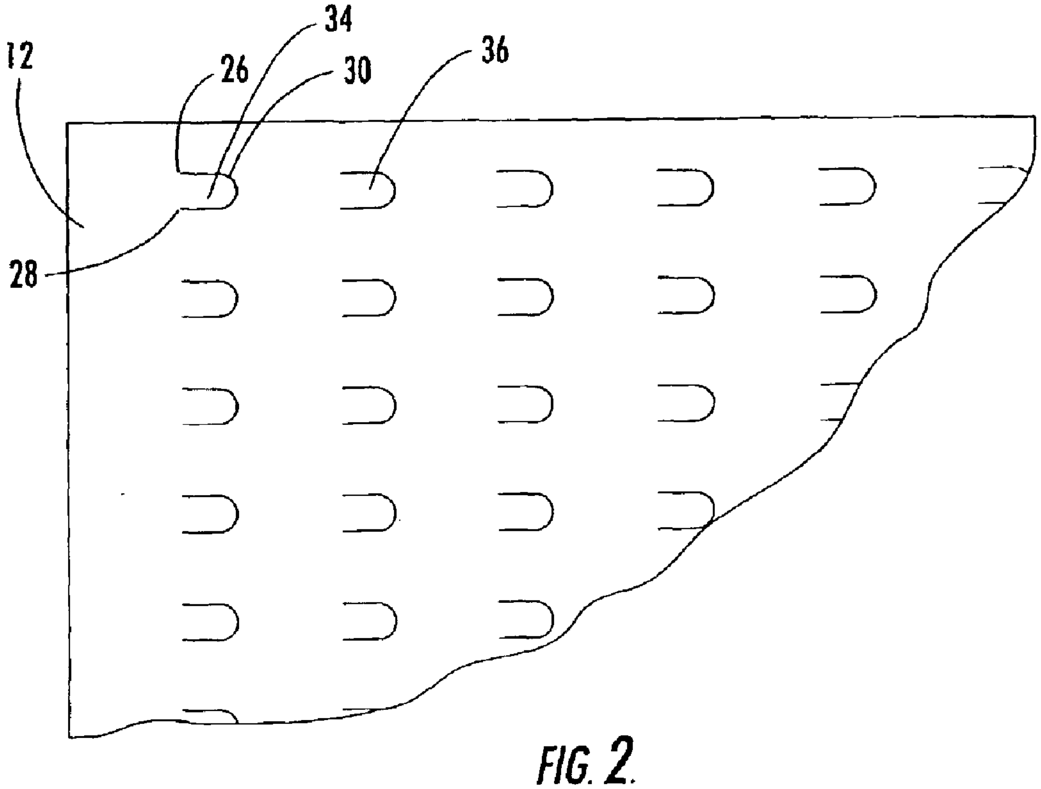
Figure 3:
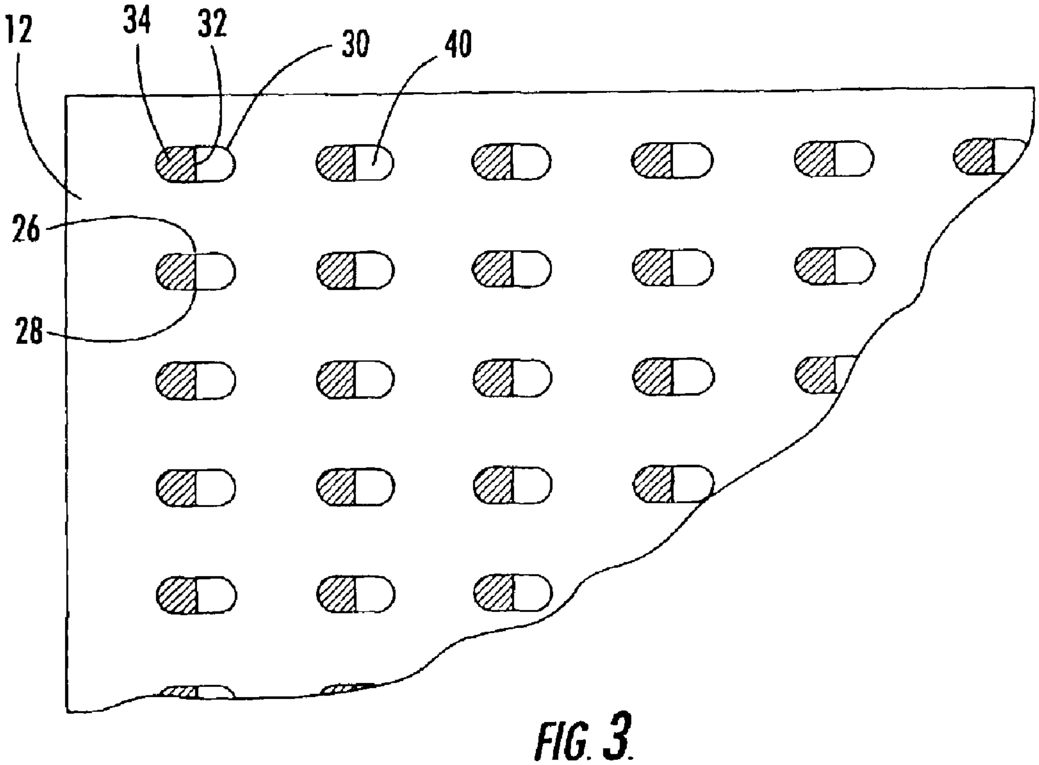
Figure 4:
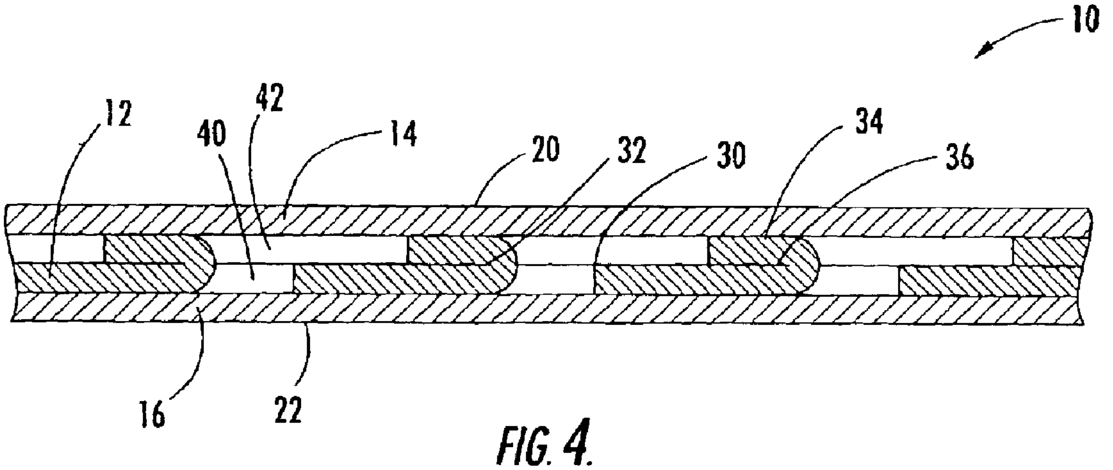
Figure 5:
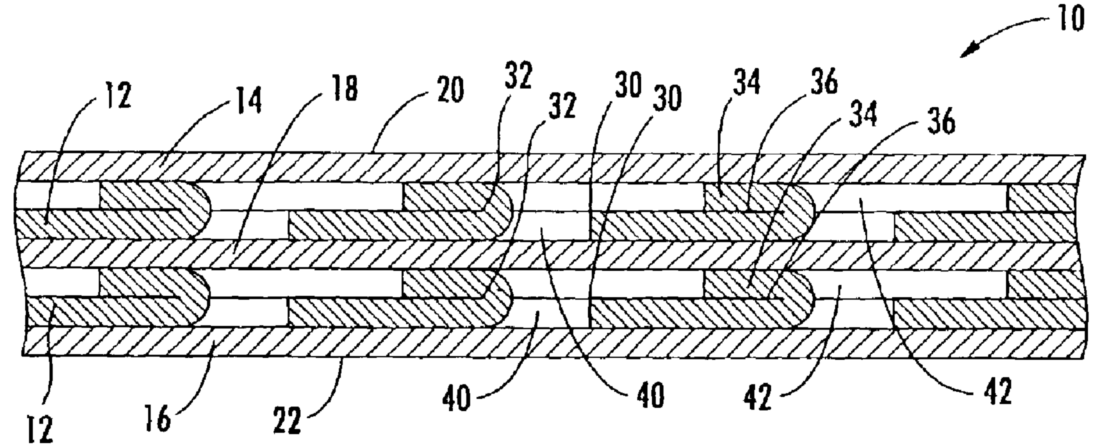
Figure 6:
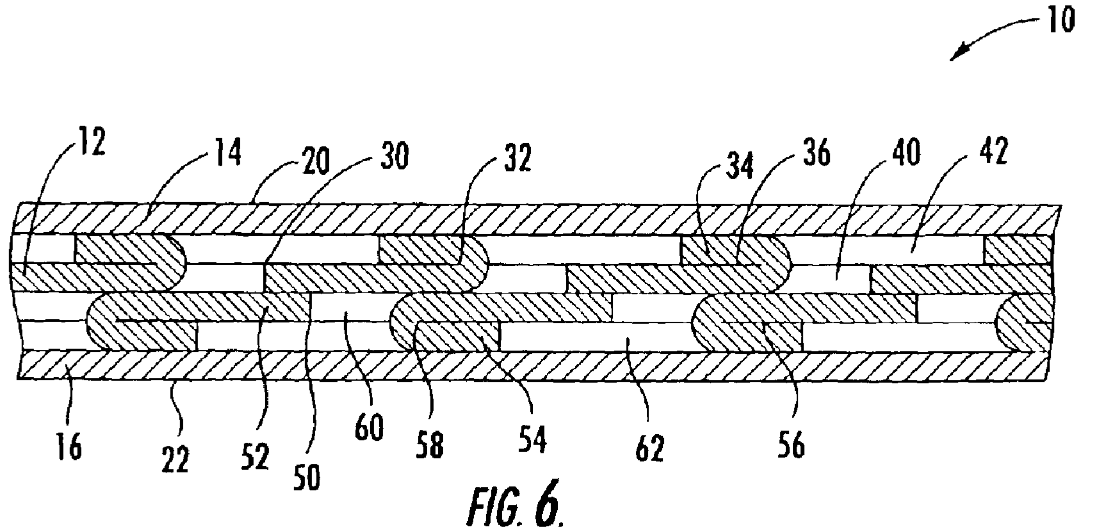
Figure 7:
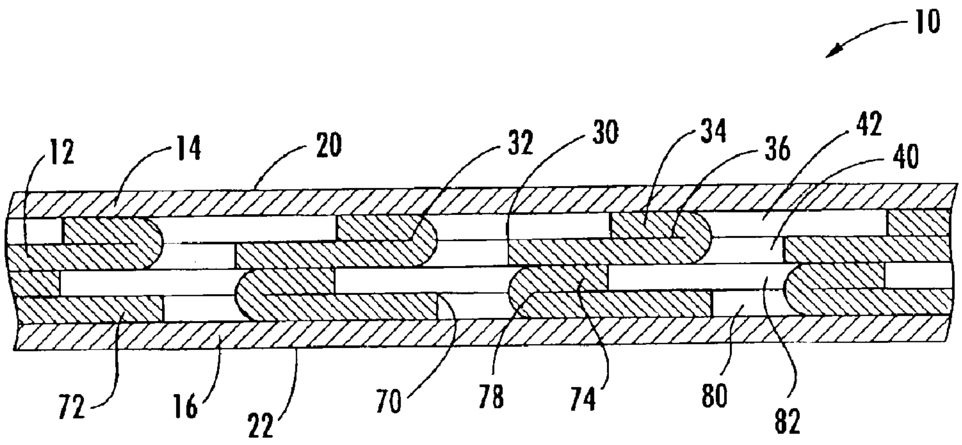
Figure 8:
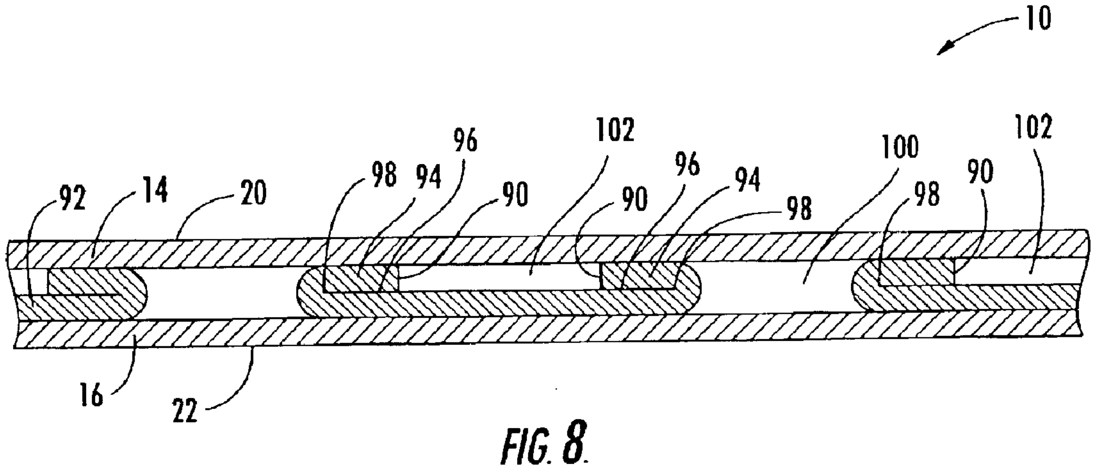

Having thus described the invention in general terms, reference will now be made to the accompanying drawings, which are not necessarily drawn to scale, and wherein:

FIG. 1 is a perspective view of a paperboard tube;

FIG. 2 is a top view of an intermediate ply with nonlinear incisions prior to the tabs being folded;

FIG. 3 is a top view of an intermediate ply with the tabs folded along the folding axis so that the tabs overlie the intermediate ply adjacent the folding axis;

FIG. 4 is an enlarged cross-sectional view taken through the wall of the tube along the line 4—4 of FIG. 1 showing a paperboard tube with one intermediate ply having tabs;

FIG. 5 is a view similar to FIG. 4, showing a paperboard tube with two intermediate plies having tabs separated by a portioning ply not having tabs;

FIG. 6 is a view similar to FIG. 4, showing a paperboard tube with a first intermediate ply with tabs folded onto an exterior-facing surface of the first intermediate ply and a second intermediate ply with tabs folded onto an interior-facing surface of the second intermediate ply;

FIG. 7 is a view similar to FIG. 4, showing a paperboard tube with a first intermediate ply with tabs folded in a first lengthwise direction and a second intermediate ply with tabs folded in a second lengthwise direction where the second lengthwise direction is oriented 180 degrees relative to the first lengthwise direction; and FIG. 8 is a view similar to FIG. 4, showing a paperboard tube where a nonlinear incision creates two tabs on the intermediate ply.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a paperboard tube structure 10 of the present invention. The paperboard tube 10 of FIG. 1 is a spiral wound tube having a central axis 24 and having an inner surface 22 closest to the axis and an outer surface 20 farthest from the axis. Multiple plies are spirally wrapped about the axis and adhered together to form the paperboard tube 10 in a continuous process forming a tubular structure that is cut to form individual tube structures of desired length. In the paperboard tube 10 of FIG. 1, an interior paperboard ply 16 defines the inner surface 22 and an exterior paperboard ply 14 defines the outer surface 20. An intermediate paperboard ply 12 is positioned between the interior paperboard ply 16 and the exterior paperboard ply 14, as best seen in FIG. 4. Other embodiments may include additional plies between the interior and exterior plies.

Prior to being wound into the paperboard tube structure 10, the intermediate ply 12 is pierced with nonlinear incisions 30, as illustrated in FIG. 2. Advantageously, the incisions 30 can be made in the intermediate ply 12 as the ply is being fed from the roll on which it is initially contained to the winding apparatus forming the paperboard tube structure 10. Alternatively, the incisions 30 can be pre-formed in the ply before it is wound into a roll. The nonlinear incisions 30 each create a tab 34 that can be folded or rotated 180 degrees about the folding axis 32 to overlie a region of the intermediate ply 12 adjacent the folding axis, as shown in FIG. 3. It should be appreciated that the incisions 30 are nonlinear in that they do not define a straight, one-dimensional line but define a two-dimensional pattern upon the surface of the intermediate ply 12. The incisions 30 are each defined by a cut in the intermediate ply 12 that proceeds from a first endpoint 26 to a second endpoint 28, as shown in FIG. 2, in a nonlinear path that is not straight from the first endpoint to the second endpoint. The nonlinear incisions 30 may include linear portions, but the term “nonlinear” indicates the incisions are not a straight, one-dimensional line from a first endpoint 26 to a second endpoint 28. A folding axis 32, as illustrated in FIG. 3, is thus defined, extending from the first endpoint 26 to the second endpoint 28. The folding axis 32 is the line about which tab 34 is folded until the tab is parallel to and overlies the surface of the intermediate ply 12 adjacent the folding axis. As shown in FIG. 2, each tab 34 includes a contacting face 36 that contacts the intermediate ply 12 adjacent the folding axis 32 after the tab is folded about the folding axis.

The shape of the nonlinear incisions 30 is not critical. In the embodiment shown in FIG. 2, each incision is horseshoe-shaped, but other embodiments of the invention may include incisions that are arcuate (e.g., semi-circular, parabolic, etc.), multilateral, or a combination of both. Non-limiting examples of multilateral incisions 30 are triangles, rectangles, trapezoids, and pentagons, wherein the folding axis 32 defines one side of the multilateral shape. A plurality of incisions 30 are produced on each intermediate ply and may be of any size and arranged in any pattern relative to the neighboring incisions. As shown in FIG. 2 and FIG. 3, the incisions 30 are advantageously equally spaced apart and the folding axes 32 are aligned in a consistent direction. However, other embodiments of the invention may include tabs 34 disparately positioned, dissimilarly sized, or diversely oriented.

The incisions 30 must be sized and spaced so that the tabs 34 collectively act to cause a contiguous ply to be effectively supported by the tabs. Therefore, the dimensions and locations of the incisions 30 and orientation of the tabs 34 are advantageously tailored for the particular application of the resulting paperboard tube 10. Once the paperboard tube 10 is wound, the tabs 34 allow a contiguous ply to be separated from the ply with cut-and-folded tabs, as illustrated in FIG. 4 where the exterior ply 14 is separated from the intermediate ply 12 by the tabs 34. However, an intermediate ply with relatively numerous tabs or relatively large tabs will retain relatively less structural strength because of the decrease in remaining ply material. The dimensions and locations of the tabs will depend upon various factors, non-limiting examples being the bending stiffness of the plies, the thickness of the plies, and the amount of radially inward compression exerted on the plies during the tube formation process. For example, as the bending stiffness of the ply decreases, the tabs formed from that ply must be spaced closer together to achieve the desired increase in bending stiffness of the resulting paperboard tube. It should also be appreciated that the shape, size, and positioning of the tabs not only affects the bending stiffness of the paperboard tube about the central axis, but also the axial and radial stiffness of the tube and the cross-sectional bending stiffness of the paperboard tube.

A single nonlinear incision 30 may also create at least two tabs 34. The nonlinear incisions 30 creating at least two tabs 34 define at least three endpoints and the tabs each have a folding axis defined by a line connecting two adjacent endpoints. Illustrative, non-limiting examples would be an incision comprising three lines of equal distance spaced 120 degrees apart converging at a vertex that would create three individual tabs. Likewise, an “E” shaped incision could generate two tabs, an “H” shaped incision could generate two tabs, and an “X” shaped incision could generate four tabs. However, as shown in FIG. 2 and FIG. 3, each of the nonlinear incisions 30 advantageously creates a single tab 34 such that all the folding axes 32 are oriented in the same direction to simply the folding process.

After the nonlinear incisions 30, as illustrated in FIG. 2, are formed by piercing the intermediate ply 12, the tabs 34 are folded about the folding axes 32 so that they are pushed out of the plane of the intermediate ply. The tabs 34 are advantageously angularly rotated 180 degrees so that each tab overlies and is parallel to the region of the intermediate ply 12 adjacent the folding axis 32, as shown in FIG. 3. A void 40 is created in the intermediate ply 12 in the space previously occupied by the tab 34 prior to the cutting and folding of the tab. Preferably, the incisions 30 are sufficiently spaced apart so that the tab 34 of one incision does not contact the tab or void 40 of a neighboring incision. Optimally, an adhesive can be applied to the contacting face 36 of the tab 34 prior to the tab being completely folded onto the intermediate ply 12 so that the tab is adhered to the region of the intermediate ply that the tab overlies.

Once the tabs 34 in intermediate ply 12 are cut and folded back the ply is wound into the paperboard tube 10 of FIG. 1. As illustrated in FIG. 4, the intermediate ply 12 is advantageously positioned between an exterior ply 14 and an interior ply 16. FIG. 4 through FIG. 8 are cross-sectional side views of a number of embodiments of the paperboard tube 10 taken along the line 4—4 of FIG. 1. It should be appreciated that even though the folding axes 32 in FIG. 4 through FIG. 8 are oriented generally perpendicular to the line 4—4, the folding axes may be oriented in any direction. Furthermore, the paperboard tube 10 may consist of any number of plies.

FIG. 4 illustrates a paperboard tube 10 of three plies and demonstrates how the thickness of the wall of the paperboard tube 10 with the cut-and-folded tabs 34 is 33% greater than the cumulative thickness of the three original plies without tabs. Dependant upon the number of plies, the proportion of plies having tabs, and the relative thickness of the various plies, the percentage increase in the thickness of the tube wall may be greater or less than 33%.

Advantageously, the paperboard tube 10 includes an interior ply 16 and an exterior ply 14 that do not contain cut-and-folded tabs 34, as shown in FIG. 4, to provide smooth inner and outer wall surfaces. A paperboard tube 10 with an interior ply 16 and exterior ply 14 having tabs 34 provides a discontinuous inner surface 22 and outer surface 20, respectively, that may contact the products associated with the paperboard tube or interfere with the application of the paperboard tube. However, further embodiments of the present invention may include cut-and-folded tabs on the exterior ply 14, the interior ply 16, or both plies.

FIG. 4 is a cross-sectional view of a paperboard tube 10 having cut-and-folded tabs 34. FIG. 4 illustrates an embodiment with an exterior ply 14, a single intermediate ply 12, and an interior ply 16. The intermediate ply 12 has cut-and-folded tabs 34 each created from an individual incision 30. The tabs 34 are folded about the folding axis 32 such that each contacting face 36 of the tabs overlies and contacts a region of the intermediate ply 12 adjacent the folding axis. As shown in FIG. 4, the tabs 34 overlie the outer-facing surface of the intermediate ply 12. The tabs 34 engage the exterior ply 14 and separate the exterior ply from the regions of the intermediate ply 12 located between the tabs. The result is an introduction of void spaces in the tube wall, and an effective increase in thickness as previously noted.

More specifically, a void 40 is defined by the perimeter of the incision 30 and the portion of the tab 34 proximate the folding axis 32. A space 42 is defined between the intermediate ply 12 and the exterior ply 14 in the regions of the intermediate ply not occupied by the tabs 34. The combined volume of the voids 40 and the spaces 42 is a function of the dimensions of the tabs 34 and their area density over the intermediate ply 12, as well as the amount of the exterior ply 14 between the adjacent tabs 34. Although the exterior ply 14 may experience sagging or compression, the cut-and-folded tabs 34 nevertheless increase the effective thickness of the wall of the paperboard tube without adding any paperboard material.

The embodiment of FIG. 5 is similar to that of FIG. 4, but includes two intermediate plies 12 each having tabs separated by a partitioning ply 18 that does not have tabs. Assuming all three plies are of equal thickness, the cut-and-folded tabs 34 increase the effective thickness of the tube wall by about 40% compared to a paperboard tube without cut-and-folded tabs.

In both FIG. 4 and FIG. 5, the tabs 34 are folded in the same direction and oriented so they overlie the outer-facing surface of the intermediate plies 12. However, FIG. 6 illustrates a paperboard tube 10 with intermediate plies 12 and 52 that include tabs 34 and 54, respectively, folded in opposite lengthwise directions and overlying opposite sides of their respective intermediate plies. The embodiment of FIG. 6 does not include a partitioning ply 18 as in FIG. 5, though a partitioning ply may be included in further embodiments. The paperboard tube 10 of FIG. 6 includes an exterior ply 14, a first intermediate ply 12, a second intermediate ply 52, and an interior ply 16. The first intermediate ply 12 is configured similarly to the intermediate ply of FIG. 4 and includes tabs 34 folded along folding axis 32 so the tabs overlie the outer-facing surface of the intermediate ply and form voids 40 and spaces 42 with the exterior ply 14. The second intermediate ply 52 includes tabs 54 created by nonlinear incisions 50 formed by piercing the second intermediate ply in a similar manner as the nonlinear incisions 30 of the first intermediate ply 12 were formed. However, the folding axes 58 of intermediate ply 52 are on the opposite side of the incisions 50, in the length direction, than the folding axes 32 of intermediate ply 12. Therefore, folding the tabs 54 of intermediate ply 52 about the folding axes 58 causes the tabs 54 to project in an opposite lengthwise direction than tabs 34 of intermediate ply 12.

Furthermore, the tabs 54 of the intermediate ply 52 are folded to overlie the inner-facing surface of the intermediate ply adjacent the folding axes 58 in the paperboard tube 10 of FIG. 6. Voids 60 are defined by the perimeter of each incision 50 and the portion of the tab 54 proximate the folding axis 58, and spaces 62 are defined between the intermediate ply 52 and the interior ply 16 in regions between the tabs 54. The paperboard tube 10 of FIG. 6 has a wall with an effective thickness approximately 50% greater than an equivalent paperboard tube without the cut-and-folded tabs 34 and 54, assuming all the plies are of equal thickness.

FIG. 7 illustrates a paperboard tube 10 that includes an exterior ply 14, a first intermediate ply 12, a second intermediate ply 72, and an interior ply 16. The tabs 74 of the second intermediate ply 72 are folded about their folding axes 78 to overlie the outer-facing surface of the intermediate ply 72. The first intermediate ply 12 is configured similarly to the intermediate ply of FIG. 4 and includes tabs 34 folded along folding axes 32 to overlie the outer-facing surface of the intermediate ply 12. The second intermediate ply 72 includes tabs 74 created by nonlinear incisions 70 that were pierced in the second intermediate ply in a similar manner as the nonlinear incisions 30 of the first intermediate ply 12. However, the folding axes 78 of intermediate ply 72 are on the opposite side of the incisions 70 in the length direction than the folding axes 32 of intermediate ply 12. Therefore, folding the tabs 74 of intermediate ply 72 about the folding axes 78 causes the tabs to project in an opposite lengthwise direction than tabs 34 of intermediate ply 12. The tabs 34 project in a first lengthwise direction and the tabs 74 project in a second lengthwise direction, such that the second lengthwise direction is oriented 180 degrees relative to the first lengthwise direction.

The paperboard tube 10 of FIG. 7 includes voids 80 defined by the perimeter of each incision 70 and the portion of the tab 74 proximate the folding axis 78 and includes spaces 82 defined between the intermediate ply 72 and the regions of the intermediate ply 12 not occupied by the tabs 74. As in FIG. 6, the wall of the paperboard tube 10 of FIG. 7 has an effective thickness approximately 50% greater than an equivalent paperboard tube without the cut-and-folded tabs 34 and 74, assuming all the plies are of equal thickness.

The paperboard tube 10 of FIG. 8 includes an intermediate ply 92 with nonlinear incisions 90 that each create two tabs 94. The intermediate ply 92 is disposed between an exterior ply 14 and an interior ply 16. The incision 90 of FIG. 8 is advantageously an "H" incision that creates two folding axes 98 that allow each of the two tabs 94 to be folded in opposite lengthwise directions. The tabs 94 are each folded about their respective folding axis 98 to overlie the outer-facing surface of the intermediate ply 92 adjacent the folding axis. Voids 100 are defined by the perimeter of each incision 90 and the portion of the tabs 94 proximate the folding axes 98, and spaces 102 are defined between the intermediate ply 92 and the exterior ply 14 in the regions not occupied by the tabs 94. Assuming all the plies are of equal thickness, the paperboard tube 10 of FIG. 8 has a wall with an effective thickness 33% greater than an equivalent paperboard tube without cut-and-folded tabs.

Paperboard tubes of the present invention can include further embodiments with any combination of number of plies, number of incisions, shape of incisions, arrangement of incisions, or orientations of cut-and-folded tab. The optimal combination will depend upon the the particular paperboard tube and its intended application.

To manufacture a paperboard tube 10 of the present invention, the tabs of the intermediate ply or plies must be cut and folded prior to winding of the paperboard tube. As noted, the intermediate ply can be pierced with the nonlinear incisions as the ply progresses towards the mandrel about which the ply will be spirally wound. After the incisions has been made, or while the ply is being pierced, the resulting tab is folded about the folding axis to overlie a surface of the ply adjacent the folding axis. The tab may be folded to overlie the surface of the intermediate ply facing the mandrel, thus overlying the inner-facing surface of the ply, or to overlie the surface of the intermediate ply facing away from the mandrel, thus overlying the outer-facing surface of the ply. Adhesive for joining the various plies together can be applied to the ply or plies having tabs, or alternatively can be applied to adjacent plies. For example, in the tube of FIG. 4, adhesive can be applied to the outer surface of the inner ply 16 and the intermediate ply 12, or to the outer-facing surface of the intermediate ply 12 and the inner surface of the exterior ply 14.

Once the tabs have been cut and folded, the ply is wound around the mandrel. Advantageously at least one ply not having tabs is wound onto the mandrel before one or more intermediate plies (one or more of which have tabs) are wound, and finally an exterior ply not having tabs is advantageously wrapped. The resulting tubular structure is cut to form individual paperboard tubes.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A paperboard tube, comprising:

a plurality of paperboard plies wrapped one atop another about an axis to form a paperboard tube structure, the plies including an interior paperboard ply proximate an inner surface of the tube structure, an exterior paperboard ply proximate an outer surface of the tube structure, and at least one intermediate paperboard ply positioned between the interior and exterior paperboard plies;

wherein the at least one intermediate ply includes a plurality of tabs each created by a nonlinear incision in the intermediate ply that extends from a first endpoint to a second endpoint thereby creating a folding axis along a line from the first endpoint to the second endpoint of the nonlinear incision about which the tab is folded to overlie a region of the intermediate ply adjacent the folding axis, whereby the tabs increase the effective thickness of the at least one intermediate ply.

2. A paperboard tube according to claim 1, wherein the nonlinear incisions are arcuate.

3. A paperboard tube according to claim 1, wherein the nonlinear incisions are multilateral.

4. A paperboard tube according to claim 1, wherein each tab is adhered to the region of the intermediate ply that the tab overlies.

5. A paperboard tube according to claim 1, wherein the nonlinear incisions each include at least three endpoints and create at least two tabs, wherein each tab has a folding axis along a line between two adjacent endpoints and each tab is folded about the folding axis to overlie a region of the intermediate ply adjacent the folding axis.

6. A paperboard tube according to claim 1, wherein the paperboard tube structure comprises a plurality of intermediate plies positioned between the interior paperboard ply and the exterior paperboard ply.

7. A paperboard tube according to claim 6, wherein at least two of the intermediate plies include tabs.

8. A paperboard tube according to claim 7, wherein one of the intermediate plies includes tabs folded to overlie a region of the intermediate ply adjacent the folding axis on an outer-facing surface of the intermediate ply and another of the intermediate plies includes tabs folded to overlie a region of the intermediate ply adjacent the folding axis on an inner-facing surface of the intermediate ply.

9. A paperboard tube according to claim 7, wherein the intermediate plies having tabs are separated by at least one partitioning ply not having tabs.

10. A paperboard tube according to claim 7, wherein one of the intermediate plies includes at least one ply with tabs projecting in a first lengthwise direction and another of the intermediate plies includes tabs projecting in a second lengthwise direction.

11. A paperboard tube according to claim 10, wherein the second lengthwise direction is oriented 180 degrees relative to the first lengthwise direction.

12. A method of manufacturing a paperboard tube, comprising the steps of:

piercing at least one intermediate ply with a plurality of nonlinear incisions that each extend from a first endpoint to a second endpoint thereby creating a tab and a folding axis for the tab defined by a line between the first endpoint and the second endpoint;

folding the plurality of tabs about the folding axes of the tabs so that each tab overlies a region of the intermediate ply adjacent the folding axis; and winding a plurality of plies, including the at least one intermediate ply, one atop another about an axis to form a paperboard tube, wherein the at least one intermediate ply is disposed between an interior paperboard ply defining an inner surface of the paperboard tube and an exterior paperboard ply defining an outer surface of the paperboard tube.

13. A method according to claim 12, wherein the piercing step creates arcuate nonlinear incisions.

14. A method according to claim 12, wherein the piercing step creates multilateral nonlinear incisions.

15. A method according to claim 12, wherein the folding step further comprises the step of adhering each tab to the region of the intermediate ply that the tab overlies.

16. A method according to claim 12, wherein the piercing step creates nonlinear incisions that each include at least three endpoints and create at least two tabs, wherein each tab has a folding axis along a line between two adjacent endpoints and each tab is folded about the folding axis to overlie a region of the intermediate ply adjacent the folding axis.

17. A method according to claim 12, wherein the piercing step, the folding step, and the winding step are performed on a plurality of intermediate plies such that the intermediate plies are positioned between the interior paperboard ply and the exterior paperboard ply.

18. A method according to claim 17, wherein the winding step includes at least two of the intermediate plies with tabs.

19. A method according to claim 18, wherein the winding step is performed such that the tabs of one of the intermediate plies are folded to overlie an outer-facing surface of the intermediate ply and the tabs of another of the intermediate plies are folded to overlie an inner-facing surface of the intermediate ply.

20. A method according to claim 18, wherein the winding step is performed such that the intermediate plies with tabs are separated by at least one partitioning ply not having tabs.

21. A method according to claim 18, wherein the folding step is performed such that one of the intermediate plies has tabs projecting in a first lengthwise direction and another of the intermediate plies has tabs projecting in a second lengthwise direction.

22. A method according to claim 21, wherein the folding step is performed such that the second lengthwise direction is oriented 180 degrees relative to the first lengthwise direction.

23. A paperboard tube, comprising:

a plurality of paperboard plies wrapped one atop another about an axis to form a paperboard tube structure, the plies including an interior paperboard ply proximate an inner surface of the tube structure, an exterior paperboard ply proximate an outer surface of the tube structure, and a plurality of intermediate paperboard plies positioned between the interior and exterior paperboard plies;

wherein at least two of the intermediate plies include a plurality of tabs each created by a nonlinear incision in the intermediate ply that extends from a first endpoint to a second endpoint thereby creating a folding axis along a line from the first endpoint to the second endpoint of the nonlinear incision about which the tab is folded to overlie a region of the intermediate ply adjacent the folding axis, whereby the tabs increase the effective thickness of the at least two intermediate plies.

24. A paperboard tube according to claim 23, wherein the nonlinear incisions are multilateral.

25. A paperboard tube according to claim 23, wherein each tab is adhered to the region of the intermediate ply that the tab overlies.

26. A paperboard tube according to claim 23, wherein the nonlinear incisions each include at least three endpoints and create at least two tabs, wherein each tab has a folding axis along a line between two adjacent endpoints and each tab is folded about the folding axis to overlie a region of the intermediate ply adjacent the folding axis.

27. A paperboard tube according to claim 23, wherein the intermediate plies having tabs are separated by at least one partitioning ply not having tabs.

* * * * *